United States Patent [19]

Hansen et al.

[11] Patent Number: 4,474,049

[45] Date of Patent: Oct. 2, 1984

[54] METER PROVING METHOD

[75] Inventors: Glen E. Hansen; Allan M. Malloy, both of Drayton Valley, Canada

[73] Assignee: D. V. Meter, Ltd., Drayton Valley, Canada

[21] Appl. No.: 440,665

[22] Filed: Nov. 10, 1982

[30] Foreign Application Priority Data

Nov. 30, 1981 [CA] Canada ................................. 391178

[51] Int. Cl.³ .......................... G01F 3/00; G01F 3/38; G01F 25/00
[52] U.S. Cl. ......................................................... 73/3
[58] Field of Search ..................................... 73/3, 168

[56] References Cited

U.S. PATENT DOCUMENTS

| | | | |
|---|---|---|---|
| 3,021,703 | 2/1962 | Pfrehm | 73/3 |
| 3,212,318 | 10/1965 | Lomax | 73/3 |
| 4,073,304 | 2/1978 | Lerner et al. | 73/3 X |

Primary Examiner—S. Clement Swisher
Assistant Examiner—James R. Giebel
Attorney, Agent, or Firm—Jones, Tullar & Cooper

[57] ABSTRACT

The invention relates to improved methods of proving the calibration of meters, such as oil and water meters used in measuring fluid output of a producing oil well prior to the fluid reaching a stock tank. The method generally involves connecting a prover vessel, having an accurate volume reading sight glass, downstream of the meter to be tested, introducing a first volume of fluid into the prover vessel, degassing the fluid and pressurizing the vessel so as to establish a baseline reading. A preselected volume of fluid as registered by the meter is then introduced into the vessel, degassing and pressurizing are repeated and a second volume reading is obtained. The volume represented by the difference between the second and first volumes read at the prover vessel is divided by the volume registered by the meter to obtain a factor by which a meter reading may be multiplied to derive the true volume of fluid passing thereby. The volumes recorded may be temperature corrected to 15° C. before the dividing step. The proved vessel may be portable so that it can be taken from well to well by a prover crew.

14 Claims, 3 Drawing Figures

METER PROVING METHOD

BACKGROUND OF THE INVENTION

This invention relates to the proving or calibration of fluid meters and particularly to the proving of oil well volumetric meters.

Once an oil well is in production it will pump a solution of oil and water along with natural gas entrained therein to the surface. This fluid is pumped along a pipeline to a testing station or satellite where the oil-gas-water mixture is fed into a test separator. At the separator the gas, being lighter, is separated from the oil and water mixture and is taken out through the top of the separator vessel. The water, being heavier than the oil, is taken from the bottom of the separator vessel. The oil, which floats on the water in the separator vessel, is skimmed from the vessel through an outlet located about ⅓ of the vessel's height above the water outlet. Each constituent is metered as it flows from the separator vessel whereby the total production of the well may be determined. In these days of high energy costs many governments require that an accurate record of production of wells within their jurisdiction be maintained. Such governments also usually require that the meters used to measure oil, gas and water be repaired and calibrated for accuracy on a regular basis.

The calibration (or proving) of a meter involves obtaining an accurate reading by way of a separate meter of the volume of fluid passing the meter in question for a specific period of time. It is possible to install separate proving apparatus on a permanent basis in the pipeline near the meter, which apparatus can be used on a regular basis to check the accuracy of the meter. Alternatively, portable proving equipment can be used, which equipment is taken from well to well, thereby reducing the capitalization required. Such portable equipment conventionally involves a portable tank having a sight glass thereon. The tank is connected to the pipeline downstream of the meter. A specific volume of fluid is fed into the tank and the volume caught in the tank is compared with the volume recorded by the meter during the period of flowing fluid into the tank. The ratio between the two volumes recorded provides a factor by which the meter reading can be multiplied to achieve the correct volume of fluid produced by the well.

The above describes the basic steps taken to prove a fluid meter. If the steps are followed closely then a reasonably accurate factor can be obtained. If the steps are not followed closely then inaccuracies will result. Furthermore, when dealing with oil meters, inaccuracies can result if there are surges in the flow; if the oil is not sufficiently degassed (giving inaccurate volumes); or if there are no corrections for temperatures (i.e. if the recorded volume is not corrected to the temperature at which the meter was factory calibrated).

SUMMARY OF THE INVENTION

The present invention is concerned primarily with the proving of oil meters although some of the principles enunciated hereinafter could be used, for example, with the water meter as well. Essentially the present invention relates to improvements in the basic procedure outlined hereinabove to achieve a much higher degree of accuracy in obtaining the meter correction factor. By following the improved procedure the number of test runs to achieve an accurate factor is reduced and, more significantly, the accuracy of the factor does not depend on the expertise of the proving operator.

In order to utilize the procedures of the present invention is is also necessary to revise slightly the apparatus of the test satellite. That apparatus, for the oil meter, includes a conduit leading to the meter and a valved by-pass conduit whereby flow may be directed exclusively through the meter or the by-pass conduit. A dump valve downstream of the meter and the by-pass is used to maintain the designed pressure drop across the meter. The dump valve has a pilot supply pressure fed thereto from the separator vessel. Downstream of the dump valve, in the main pipeline are two spaced apart valved calibration connections to which the prover vessel is connected. A shut-off valve is provided in the main pipeline between these connections. In order to practice the present invention effectively it is recommended that a tap be provided in the meter connections for bleeding off the meter and for ascertaining the pressure drop across the meter to ensure that it is up to design specification. Also it is recommended that a second by-pass line be valved into the first by-pass line and into the main pipeline downstream of the last calibration connection so that the meter and the other aforementioned valves may be repaired without shutting down the entire system.

There are several steps which may be added to the basic proving procedure by the present invention which result in improved accuracy in determining the meter factor. Firstly it is recommended that the pressure drop across the meter be determined and, if it is not at the designed level, the port in the dump valve should be changed to bring the pressure drop back to specification. Then, once the prover has been connected to the pipeline by way of the calibration connections, and a suitable initial volume of fluid has been fed to the prover vessel and has degassed so as to provide an initial (or zero) base level in the vessel, the separator vessel should be allowed to dump fluid into the main pipeline to establish a "packed" line from the dump valve to the first calibration connection valve. That first valve is then opened to permit the separator to dump a predetermined volume of fluid, say about 100 liters, into the prover vessel at the same rate of flow or pressure drop as previously determined. Just before that volume is reached, say within about 4% thereof, the operator should be ready to close the first valve and when that is done the line from the dump valve to the first valve will be repacked with fluid. Then, once the prover has been isolated and the meter reading recorded, so as to ascertain the volume of fluid recorded by the meter, the prover vessel is completely degassed and it is then possible to take a reading on the sight glass of the prover vessel and determine the total volume of fluid that entered the prover vessel. That volume is compared with the volume recorded by the meter to determine a true factor for the meter in question.

If the well produces more than 5 cubic meters per day it is recommended that the operator make at least two runs to determine an "as found" meter factor. Then, since it is likely that repairs will be required the meter should be repaired so as to put it into a like-new condition, after which an average of three final calibration runs can be made to compute the new factor for the repaired meter.

Broadly speaking, therefore, the present invention may be broadly defined as providing the method of proving the calibration of a fluid flow meter which registers the volume of fluid passing therethrough, the meter being in a conduit downstream of a separator vessel, comprising the steps of: (a) connecting a prover vessel to the conduit downstream of the dump valve, there being a shut-off valve in the connection between the prover vessel and the conduit, the prover vessel having accurate volume reading means thereon; (b) opening the shut-off valve to introduce a first volume of fluid via the conduit into the prover vessel, closing the shut-off valve to isolate the prover vessel from the conduit, completely degassing the first volume of fluid within the prover vessel and establishing a first volume reading for the fluid introduced into the prover vessel; (c) permitting the conduit to pack with fluid between the dump valve and the closed shut-off valve; (d) establishing a baseline reading on the meter, opening the shut-off valve to introduce a second volume of fluid into the prover vessel, closing the shut-off valve to isolate the prover vessel from the conduit, permitting the conduit to pack with fluid between the dump valve and the closed shut-off valve, establishing a final reading on the meter, completely degassing the total volume of fluid in the prover vessel, and establishing a second volume reading for the total volume of fluid; and (e) dividing the volume represented by the difference between the second and first volume readings at the prover vessel by the volume represented by the difference between the final and baseline registered at the meter in order to determine a meter factor by which a volume registered by the meter may be multiplied to derive the true volume of fluid passed through the meter.

DESCRIPTION OF THE PREFERRED EMBODIMENT

Figure 1:
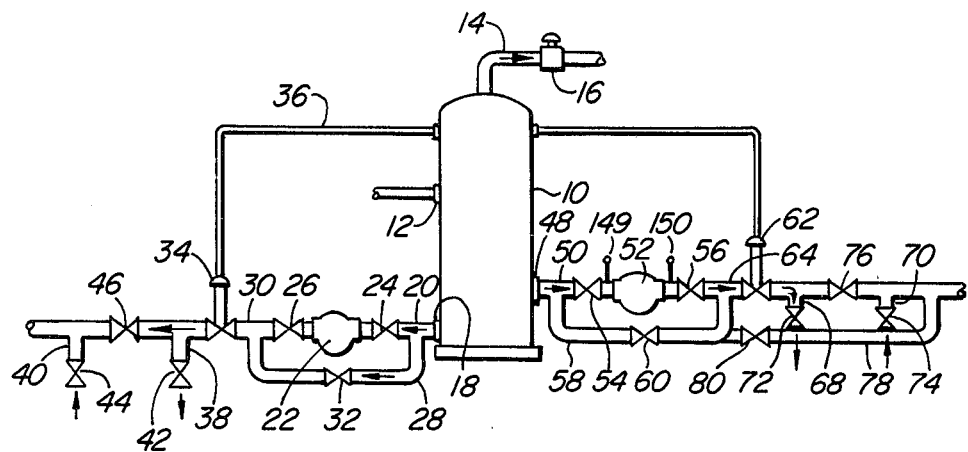
FIG. 1 shows in schematic form a test separator facility modified as per the present invention.

FIG. 1 shows the test satellite to which the oil-water-gas mixture is pumped from the well. The satellite includes a main vessel 10 having an inlet 12 through which the aforementioned mixture is introduced from the well to the vessel 10. The gas, which is lighter than the other two constituents rises to the top of the vessel and exits through a conduit 14, passes through a volume gas meter (not shown) and a back pressure valve, whereby the volume of gas produced may be ascertained. The water, being the heaviest constituent exits the vessel 10 via an outlet 18 at the base of the vessel. Outlet conduit 20 leads from outlet 18 to a volume meter 22 by way of shut-off valve 24 whereby the meter records the volume of water passing thereby. A shut-off valve 26 is provided at the exit side of the meter. The meter can be isolated for repair or replacement by shutting the two valves 24, 26. If valves 24, 26 are closed the water will flow through a by-pass conduit 28 connected at one end to conduit 20 and at the other end to exit conduit 30. A normally closed shut-off valve 32 is provided in the by-pass conduit, valve 32 being opened only when it is desired to by-pass the meter 22.

Exit conduit 30 carries a snap acting liquid level valve 34 which is fed by a pilot supply of pressure via conduit 36. Downsteam of valve 34 are two calibration connections 38 and 40 controlled by shut-off valves 42 and 44 respectively. A shut-off valve 46 is positioned in the conduit 30 between the connections 38 and 40. When the meter 22 is to be calibrated or proved the portable proving equipment would be connected to the calibration connections 38 and 40. Otherwise these connections are unused.

The oil is taken from the vessel 10 by an outlet 48 about ⅓ of the height of the vessel above the water outlet 18. Without the modifications suggested by the present invention the oil conduit system would appear identical to the water metering system just described. At any rate the oil system includes an outlet conduit 50, an oil meter 52, shut-off valves 54, 56, bypass conduit 58, by-pass shut-off valve 60, snap acting liquid level valve 62 in outlet conduit 64, pilot supply conduit 66, calibration connections 68, 70, calibration shut-off valves 72, 74, and shut-off valve 76. As modified in accordance with the present invention an optional by-pass extension 78 leading from by-pass 58 via shut-off valve 80 and terminating in exit conduit 64 downstream of calibration connection 70 may be provided. Such an extension could be provided in the water metering system as well if the procedure of the present invention is to be used to prove the water meter. The purpose of the extension 78 will become apparent hereinafter. Also added are pressure taps 149, 150 used to determine the pressure drop across meter 52. They can be used as well to depressurize the meter when it is to be repaired.

Figure 2:
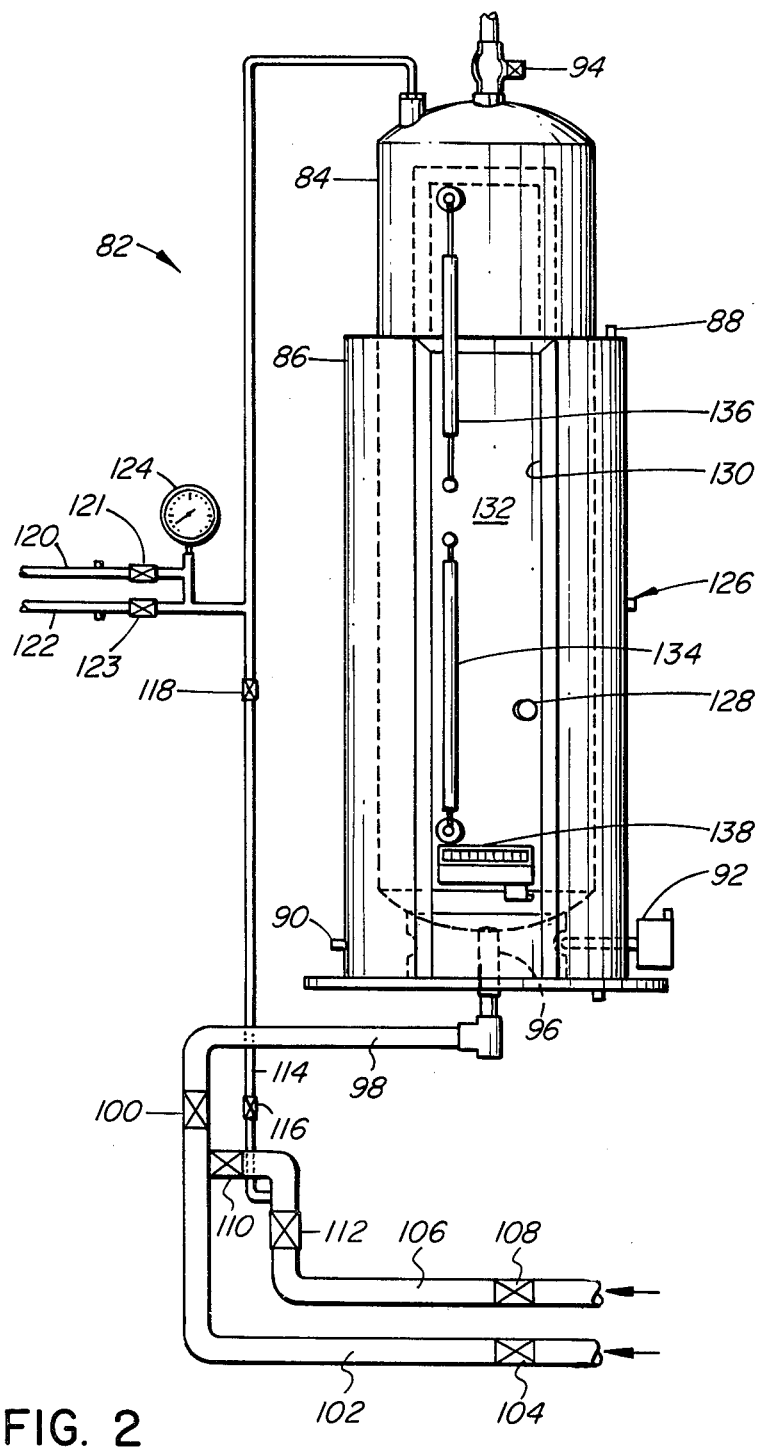
FIG. 2 shows a portable prover apparatus as used in the present invention.

FIG. 2 shows a portable prover 82 as it might be mounted on a vehicle, such as a truck or a trailer. The prover 82 includes a pressure vessel 84 contained within a surrounding housing or jacket 86, the jacket being sealed to the tank so that an anti-freeze fluid, such as ethylene glycol may be contained therein for winter operation. The jacket is provided with an inlet 88 and an outlet or drain 90 for the glycol. An electric immersion heater 92 is provided to heat the glycol in extremely frigid conditions.

The tank 84 has a pressure release safety valve 94 at the top and a fluid inlet/outlet 96 at the bottom. Inlet/outlet 96 is connected to a conduit 98 containing a shut-off valve 100 which in turn is connected to a conduit 102 which is connected to calibration connection 68 when in use. A further conduit 106 is connected at one end via valve 110 to the conduit 102 and in use the other end would be connected to the calibration connection 70. A check valve 112 is contained in the conduit 106 to prevent unwanted reverse flow.

A gas equalizer line 114 is connected at one end to the conduit 106 and at the other end to the top of the tank 84. Line 114 contains a check valve 116 and a block or shut off valve 118. A metered gas inlet line 120 feeds into the line 114 and is also connected to a vent line 122. Lines 120 and 122 are valved so that the desired flow paths may be established and controlled. A pressure gauge 124 is provided so as to monitor the gas pressure in the lines 114 and 120 and in tank 84.

Also provided are two collars 126, 128 the former for receiving an appropriate measuring device to monitor the temperature of glycol in the jacket 86 and the latter, positioned on the tank 84, for receiving an appropriate measuring device to monitor the temperature of the fluid within the prover tank 84.

An opening 130 in the jacket 86 provides access to a sight glass chamber 132 which is, of course sealed in so far as the glycol chamber is concerned. Contained within chamber 132 are one or two vertically spaced apart and aligned sight glasses 134, 136 both of which are fluidly connected to the tank and are calibrated so as to accurately display the volume of fluid within the tank. The sight glass chamber should also be provided with an explosion-proof propane heater 138 so as to keep that chamber at an appropriate temperature during operation in cold weather.

A typical prover vessel or tank 84 will have a minimum volume of 160 liters, a diameter in the calibrated zone of between 16 and 24 inches (O.D.) and means for ensuring that it is level in operation. Desirably the scales on the sight glasses will be in increments of $\frac{1}{2}\%$ and one should be able to distinguish to $\frac{1}{4}\%$ in measurement area. Calibration points should be at $-5\%$, 0, $+5\%$, 20%, 40%, 60%, 80%, 90%, 95%, 100%, 105% and 110%.

Figure 3:
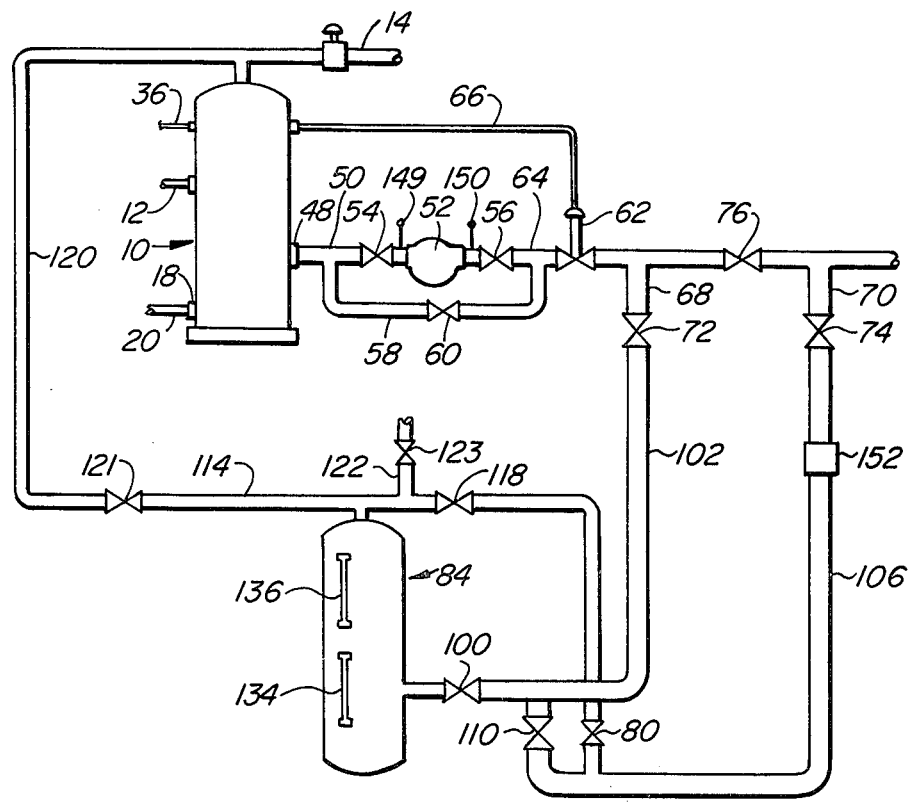
FIG. 3 shows in schematic form the manner in which the portable prover apparatus is connected to the test separator for proving an oil meter.

FIG. 3 illustrates schematically the manner in which the separator vessel is hooked or connected to the prover vessel or tank 84 so that calibration of the oil meter 52 may be effected. First of all the conduit 102 of the prover is secured to the calibration connection 68 in the conduit 64 and in a similar manner the conduit 106 of the prover is connected to the calibration connection 70. The gas inlet line 114 is connected to the gas outlet line 120 from the separator vessel. These are the only connections required to effect proving of the oil meter 52. The steps to be taken in carrying out the procedure of the invention will be presented hereinbelow with reference to FIGS. 1, 2 and 3.

Having connected the prover into the separator system as illustrated in FIG. 3, and assuming total production is less than 5 m$^3$ per day, the operator should first of all put the meter into an "as-new" condition should it be inoperable as found. To do this the operator would isolate the meter by opening the valve 60 and closing the valves 54 and 56 to send the oil through the bypass conduit 58, thereby removing the meter from the circuit. The meter would then be bled of oil through pressure tap 150 and repaired as necessary. After repair the meter should be pressure tested and the rate of flow and pressure drop across the meter checked to ensure that they meet the manufacturers specifications. If they do not, further repair, including replacement of meter parts or the port in dump valve 62, should be effected to bring the meter into agreement with its specification. By utilizing by-pass 78 valve 62 could be repaired without shutting down the separator vessel 10. Once the meter is in like-new condition proving can begin.

If the meter is operable and if the well is producing more than 5 m$^3$ per day it is desirable to establish an approximate "as found" meter factor by way of the following proving steps before effecting any repairs to the meter. This will provide an indication of the drop in efficiency of the meter between repairs.

In order to proceed with proving of the meter 52 the operator first of all opens valves 72 and 100 to permit an initial volume of fluid to enter the prover vessel 84. During this step valve 74 is open and valve 76 is closed, valve 110 is closed, valve 118 is closed, valve 121 is closed and valve 123 is open (venting to atmosphere). The operator then closes valve 100 and then 72 to isolate the prover, keeping valve 123 open so that the initial volume of oil in the vessel 84 can completely degas. During this step valve 76 is opened to keep the separator vessel 10 from flooding. The operator then closes the vent valve 123 and opens the gas supply valve 121 which permits gas flow from the separator vessel 10 to the prover vessel 84 and hence the pressure in the prover vessel is brought up to operating pressure (the pressure of gas in the separator vessel 10). Once the prover vessel is at operating pressure valve 100 is opened and then a zero point or baseline reading is taken on the sight glass 134 on the prover vessel.

The gas line 114 is then opened to the downstream side of the proving manifold by closing gas supply valve 121 and opening equalizing valve 118. Valve 76 is then closed and with valve 72 closed the separator is allowed to pack lines 64 and 68 from the dump valve 62 to the valve 72. When this is complete a zero or base reading is taken on the register of the meter 52 and the valve 72 is opened whereby the test separator 10 can dump as it would normally until almost 100 liters (1/10 m$^3$) of oil have been dumped into the prover vessel 84 (valve 100 open, valve 110 closed).

At a point when about 96% of the 100 liters has been reached on the register of meter 52 the operator should be ready to close valve 72 so that it can be closed right at the 100 liter reading. The valve is then closed, at the 100 liter meter reading, so as to repack the lines 64 and 68 from the dump valve 62 to the valve 72. Whenever valve 72 is being opened or closed the dump valve 62 must be open.

When the run has stopped, the prover vessel is isolated by closing valves 100 and 118 and by opening valve 76. The operator then allows the oil in the prover vessel 84 to degas as by opening valve 123. When the vessel is completely degassed valve 121 is opened (valve 123 closed) to increase the pressure in the vessel 84 by about 15 to 20 psi so as to settle any foam on the surface of the oil in the vessel 84. A test sight glass reading from glass 136 is taken and valve 121 is again opened to bring the prover vessel 84 up to the operating pressure. Another test sight glass reading is taken and if there is no change in the reading that reading represents the final reading for that run. If the test reading changes there is thus an indication that insufficient time has been taken for degassing and the degassing steps outlined above must be repeated until there is no change in the gauge reading between 15 psi and the operating pressure. Several runs are suggested for each well in order to obtain more accurate readings so that a better determination of the meter factor can be obtained. Care must be taken to ensure that all gauge readings are taken at the same static pressure to reduce any error caused by remaining entrained gas in the oil. When satisfied that degassing is complete valve 100 is opened and the final sight glass reading is recorded.

When all base line readings in the prover vessel are taken the valve 100 is open. With the prover vessel being pressurized up to a known pressure, usually that of the separator vessel 10, the fluid and entrained gas in the line 102 is forced towards the valve 72 at the same pressure for each base line reading. By opening valve 100 only when the vessel 84 is up to its operating pressure the entrained gas cannot escape from line 102 into the prover vessel.

If the valve 100 is used for control rather than valve 72, packing of lines 64, 68 and 102 will take place from the dump valve 62 to the valve 100 when the latter valve is closed. The base reading is taken with valve 100 closed and then the valve 100 is opened, with valve 72 open and valve 110 closed, so as to dump the desired volume into the prover vessel. During dumping, the operator refers to the sight glasses 134, 136 to ascertain the correct time to close valve 100 (dump valve 62 open), so as to capture approximately 100 liters of fluid in the vessel 84. Valve 100 is then closed and care is taken to ensure packing of lines 64, 68 and 102 up to the valve 100. The final meter reading is recorded after packing is complete. Isolation of the prover vessel is obtained by closing valve 118 and opening either valve 110 or valve 76 so that the oil by-passes the prover vessel 84. After degassing is complete the final gauge readings can be taken (valve 100 still closed) and the meter factor calculated.

As there is a possibility that different pressures could exist in the inlet conduit 102 and the outlet conduit 106 when the valve 72 is used as the main control valve it is then desirable to equalize those pressures. Equalization is not required when valve 100 is used as the main control valve. Equalization may be achieved in one of two ways: (a) by opening the valve 110 for a short period of time (5–10 seconds) after the base reading on the prover vessel has been obtained; or (b) as previously stated, by opening the valve 100 (with valve 72 closed) to pack the line 102 back from the prover vessel to the valve 72 just before the readings are taken at the prover vessel.

When the run is complete valves 100 and 110 are opened. The pressure in the prover vessel will empty the vessel by forcing the fluid therein back through the conduit 106 to the main conduit 64.

Once a set of readings for each run has been recorded, namely the meter readings (initial and final) and the gauge (sight glass) readings (initial and final) and the temperature for each run recorded the operator can calculate a factor by which the meter reading can be multiplied to obtain the true volume of oil (in degassed stock tank oil readings) that has passed through the meter. A correction factor based on the actual temperature of oil in the meter and in the prover vessel as compared to the standard temperature of 15° C. is applied to the volumes recorded at the meter and at the prover vessel. The meter factor is then determined by dividing the temperature corrected volume at the prover vessel by the temperature corrected volume at the meter, which factor is recorded and applied to all readings taken from the meter in question until that meter is again proved (the following year, say).

Since the factor for a meter is based on a temperature corrected to 15° C. it is recommended that the volume recorded at a meter should also be subject to a daily temperature correction factor before the meter factor is applied. If it is possible to maintain constant temperature of fluid at meter 52 year-round, the temperature correction factor is eliminated and daily oil temperature correction is not required.

By following the steps as outlined above it is possible to accurately determine a meter factor for any oil meter so that a correct determination of the volume passing therethrough can be made. In following the method of the present invention it is essential that the system be packed between the open dump valve 62 and closed valve 72 or 100, depending on which is used as the main control valve, before taking the zero or base line reading on the meter register so that a normal dumping can take place after the valve 72 or 100 has been opened; that the operator closes the valve 72 or 100 at the desired reading and permit the system to repack; and that the oil in the prover vessel be completely degassed before any sight glass gauge reading is recorded.

It is also necessary to maintain a constant pressure drop or rate of flow across the meter 52 both during and after proving (this requires correct porting of dump valve 62). If the pressure drop across the meter is changed after proving has been completed, the calculated meter factor may not be applicable.

It is conceivable that people skilled in the art could vary aspects of the present invention without substantially departing from the spirit thereof. For example essentially the same procedure could be used to calibrate gas, condensate, water or meters. When the present invention is used to calibrate condensate meters problems can result when the light condensate escapes through the vent valve 123 and a true measurement thereof is not possible. The condensate then is treated as a gas and it is necessary to insert a pressure regulator 152 in the line 106 so that a known pressure is maintained in the prover vessel 84. The pressure setting of the regulator is the separator pressure minus the known pressure drop that the meter is allowed. All gauge readings are taken at that pressure setting. Also it is not necessary to degas out through the vent 123 as with oil meters and by following the other steps previoulsy discussed a flow line barrel factor is achieved. By knowing the specific gravity of the condensate and the meter factor it is then possible to calculate the condensate as a gas rather than as a liquid. Finally, the present invention can also be applied to gravimetric proving wherein the weight of fluid rather than the volume is measured. The same steps of operating the prover vessel, but based on weight, would be used. Thus the protection to be afforded the present invention should be ascertained from the claims appended hereto.

The embodiments of the invention in which an exclusive property or privilege is claimed are defined as follows:

1. The method of proving the calibration of a fluid flow meter which registers the volume of fluid passing therethrough, the meter being in a conduit downstream of a separator vessel, said conduit including a dump valve downstream of said meter comprising the steps of:
   (a) connecting a prover vessel to said conduit downstream of said dump valve, there being a shut-off valve in the connection between said prover vessel and said conduit, said prover vessel having accurate volume reading means thereon;
   (b) opening said shut-off valve to introduce a first volume of fluid via said conduit into said prover vessel, closing said shut-off valve to isolate said prover vessel from said conduit, completely degassing said first volume of fluid within said prover vessel and establishing a first volume reading for the fluid introduced into said prover vessel;
   (c) permitting said conduit to pack with fluid between said dump valve and said closed shut-off valve;
   (d) establishing a baseline reading on said meter, opening said shut-off valve to introduce a second volume of fluid into said prover vessel, closing said shut-off valve to isolate said prover vessel from said conduit, permitting said conduit to pack with fluid between said dump valve and said closed shut-off valve, establishing a final reading on said meter, completely degassing the total volume of fluid in said prover vessel, and establishing a second volume reading for said total volume of fluid in said prover vessel, and establishing a second volume reading for said total volume of fluid; and
   (e) dividing the volume represented by the difference between the second and first volume readings at the prover vessel by the volume represented by the difference between the final and baseline readings registered at said meter, in order to determine a meter factor by which a volume registered by said meter may be multiplied to derive the true volume of fluid passed through said meter.

2. The method of claim 1 including the steps of ascertaining the temperature at said meter and the temperature at said prover vessel, and correcting the volumes used in step (d) to 15° C. before performing said dividing step.

3. The method of claim 1 and including the step of permitting said conduit to pack with fluid between said dump valve and said shut-off valve, with said shut-off valve closed, before opening said shut-off valve to introduce said first volume of fluid into said prover vessel.

4. The method of claim 1 including the steps of connecting said prover vessel to a source of gas under pressure and pressurizing said prover vessel with gas following the degassing procedure of steps (b) and (d).

5. The method of claim 4 wherein said source of gas under pressure is said separator vessel.

6. The method of claim 5 wherein, with said total volume of fluid in said prover vessel as in step (d), said pressurizing step is performed in two stages, at a first pressure and then at an increased pressure, with a test volume reading being taken after each stage to determine if the test volume reading has changed, thereby indicating incomplete degassing of said total volume of fluid which then necessitates a repeat of the degassing and test volume reading portions of step (d) until there is no change in the test volume readings taken at each stage.

7. The method of claim 4 wherein, with said total volume of fluid in said prover vessel as in step (d), said pressurizing step is performed in two stages, at a first pressure and then at an increased pressure, with a test volume reading being taken after each stage to determine if the test volume reading has changed, thereby indicating incomplete degassing of said total volume of fluid which then necessitates a repeat of the degassing and test volume reading portions of step (d) until there is no change in the test volume readings taken at each stage.

8. The method of proving the calibration of a fluid flow meter which registers the volume of fluid passing therethrough, the meter being in a conduit downstream of a separator vessel, said conduit including, downstream of said meter, a dump valve, a first calibration connection, a main shut-off valve, and a second calibration connection, there being a first shut-off valve in said first calibration connection and a second shut-off valve in said second calibration connection, comprising the steps of:

(a) connecting a prover vessel to said conduit, the prover vessel having an inlet conduit, containing an inlet valve, for connection to said first shut-off valve, an outlet conduit, containing an outlet valve, for connection to said second shut-off valve and accurate volume reading means thereon;

(b) connecting a gas purge line to said separator vessel at one end and at the other end to a gas conduit interconnecting an upper portion of said prover vessel to said outlet conduit, said gas purge line containing a gas supply valve and a vent valve, said gas conduit containing a gas equalizing control valve;

(c) introducing a first volume of fluid into said prover vessel by opening said first shut-off valve and said inlet valve, with said main shut-off valve and said outlet valve closed and said second shut-off valve and said vent valve open;

(d) closing said first shut-off valve and said inlet valve, opening said main shut-off valve, and permitting the fluid in said prover vessel to completely degas;

(e) opening said gas supply valve and closing said vent valve to pressurize said prover vessel up to the operating pressure of said separator vessel, with said gas equalizing control valve closed;

(f) establishing a first volume reading for the first volume of fluid introduced into the prover vessel;

(g) opening said gas equalizing control valve and closing said gas supply valve;

(h) closing said main shut-off valve and allowing fluid to pack in the conduit between said dump valve and said first shut-off valve;

(i) establishing a baseline reading on said meter;

(j) opening said first shut-off valve and said inlet valve and introducing a second preselected volume of fluid as registered by said meter into said prover vessel;

(k) closing said first shut-off valve when said meter has registered said second preselected volume of fluid, said dump valve being open to repack the conduit between said dump valve and said closed first shut-off valve;

(l) isolating the prover vessel by closing said inlet valve and said gas equalizing control valve and opening said main shut-off valve;

(m) opening said vent valve to allow said prover vessel to completely degas;

(n) closing said vent valve and opening said gas supply valve to bring said prover vessel up to the operating pressure of said separator vessel;

(o) establishing a second volume reading for the total volume of fluid within the pressure vessel; and (p) dividing the volume represented by the difference between the second and first volume readings at the prover vessel by the volume registered by said meter, being said second preselected volume, in order to determine a meter factor by which a volume registered by said meter may be multiplied to derive the true volume of fluid passed through said meter.

9. The method of claim 8 wherein step (m) is performed in two stages with a test volume reading being taken at a first pressure stage less than said operating pressure and then at a second pressure stage equal to said operating pressure, a difference between the test volume readings taken at each stage indicating incomplete degassing of the total volume of fluid in said prover vessel and the necessity of repeating the steps (m) and (n) until there is no change in the test volume readings taken at each stage.

10. The method of claim 9 including the steps of ascertaining the temperature at said meter and the temperature at said prover vessel, and correcting the volumes used in step (p) to 15° C. before performing said dividing step.

11. The method of claim 8 wherein said outlet conduit is connected to said inlet conduit downstream of said inlet valve, and including the step of opening and then shortly thereafter closing said outlet valve after step (g) so as to equalize the pressure of fluid in said inlet and outlet conduits.

12. The method of claim 8 including the step of opening said inlet valve before each of steps (f) and (o) so as to pack said inlet conduit with fluid from said prover vessel back to said closed first shut-off valve.

13. The method of proving the calibration of a fluid flow meter which registers the volume of fluid passing therethrough, the meter being in a conduit downstream of a separator vessel, said conduit including, downstream of said meter, a dump valve, a first calibration connection, a main shut-off valve, and a second calibration connection, there being a first shut-off valve in said first calibration connection and a second shut-off valve in said second calibration connection, comprising the steps of:

(a) connecting a prover vessel to said conduit, the prover vessel having an inlet conduit, containing an inlet valve, for connection to said first shut-off valve, an outlet conduit, containing an outlet valve, for connection to said second shut-off valve and accurate volume reading means thereon;

(b) connecting a gas purge line to said separator vessel at one end and at the other end to a gas conduit interconnecting an upper portion of said prover vessel to said outlet conduit, said gas purge line containing a gas supply valve and a vent valve, said gas conduit containing a gas equalizing control valve;

(c) introducing a first volume of fluid into said prover vessel by opening said first shut-off valve and said inlet valve, with said main shut-off valve and said outlet valve closed and said second shut-off valve and said vent valve open;

(d) closing said inlet valve, opening said main shut-off valve, and permitting the fluid in said prover vessel to completely degas;

(e) opening said gas supply valve and closing said vent valve to pressurize said prover vessel up to the operating pressure of said separator vessel, with said gas equalizing control valve closed;

(f) establishing a first volume reading for the first volume of fluid introduced into the prover vessel;

(g) opening said gas equalizing control valve and closing said gas supply valve;

(h) closing said main shut-off valve and allowing fluid to pack in the conduit between said dump valve and said inlet valve;

(i) establishing a baseline reading on said meter;

(j) opening said inlet valve and introducing a second volume of fluid into said prover vessel;

(k) closing said inlet valve, said dump valve being open to repack the conduit between said dump valve and said inlet valve;

(l) establishing a final reading on said meter;

(m) further isolating the prover vessel by closing said gas equalizing control valve and opening said main shut-off valve;

(n) opening said vent valve to allow said prover vessel to completely degas;

(o) closing said vent valve and opening said gas supply valve to bring said prover vessel up to the operating pressure of said separator vessel;

(p) establishing a second volume reading for the total volume of fluid within the pressure vessel; and (q) dividing the volume represented by the difference between the second and first volume readings at the prover vessel by the volume represented by the difference between the final and baseline readings registered by said meter, in order to determine a meter factor by which a volume registered by said meter may be multiplied to derive the true volume of fluid passed through said meter.

14. The method of claim 13 wherein step (n) is performed in two stages with a test volume reading being taken at a first pressure stage less than said operating pressure and then at a second pressure stage equal to said operating pressure, a difference between the test volume readings taken at each stage indicating incomplete degassing of the total volume of fluid in said prover vessel and the necessity of repeating the steps (n) and (o) until there is no change in the test volume readings taken at each stage.

* * * * *